July 25, 1950 — O. S. FIELD ET AL — 2,516,376
AIRWAY TRAFFIC CONTROL SYSTEM
Filed Jan. 29, 1945 — 6 Sheets-Sheet 1

Inventors
O. S. Field and S. N. Wight
By Neil W. Preston,
Their Attorney

July 25, 1950     O. S. FIELD ET AL     2,516,376
AIRWAY TRAFFIC CONTROL SYSTEM
Filed Jan. 29, 1945     6 Sheets-Sheet 2

Inventors
O. S. Field and S. N. Wight
By Neil W. Preston,
Their Attorney

July 25, 1950     O. S. FIELD ET AL     2,516,376
AIRWAY TRAFFIC CONTROL SYSTEM
Filed Jan. 29, 1945     6 Sheets-Sheet 4

Inventors
O. S. Field and S. N. Wight
By Neil W. Preston,
Their Attorney

July 25, 1950     O. S. FIELD ET AL     2,516,376
AIRWAY TRAFFIC CONTROL SYSTEM
Filed Jan. 29, 1945     6 Sheets-Sheet 6

FIG. 18.

Normal – On course
Zero energy delivered
by both T3 and Tc
Zero biase in K2.

FIG. 19.

One side of course
Plus energy delivered
by tube T3 causing
plate 11 to become plus.

FIG. 20.

Other side of course
Plus energy delivered
by tube Tc causing
plate 10 to become plus.

Inventors
O. S. Field and S. N. Wight
Neil W. Preston,
Their Attorney

Patented July 25, 1950

2,516,376

UNITED STATES PATENT OFFICE 2,516,376

AIRWAY TRAFFIC CONTROL SYSTEM

Oscar S. Field and Sedgwick N. Wight, Rochester, N. Y., assignors to General Railway Signal Company, Rochester, N. Y.

Application January 29, 1945, Serial No. 575,004

21 Claims. (Cl. 343—112)

This invention relates to apparatus for directing the movement of airplanes or other moving vehicles along a specific path and which is more particularly applicable to blind course indicating and blind landing for airplanes and is an improvement over our prior applications, Ser. No. 517,814, filed January 11, 1944, Patent No. 2,463,094 granted March 1, 1949, and Ser. No. 548,660, filed August 9, 1944, Patent No. 2,463,095 granted March 1, 1949.

In earlier systems of blind landing the location of an airplane in space with respect to the runway on the airfield has been indicated by either following a radio reception line of equal intensity or by following a radio line of zero difference of intensity of two radio beams and these earlier methods have been found unsatisfactory by reason of the uncertainty of the desired intensity of emitted radio beams.

In accordance with the present invention it is proposed to employ a cathode-ray tube on an airplane, or other conveyance, and to display pictorially on the fluorescent screen thereof the relationship between the actual location of such airplane and the location of the proposed glide path along which the airplane is to fly.

As another object of the present invention it is proposed to obtain such pictorial representation on the fluorescent screen of the cathode-ray tube without the employment of scanning apparatus similar to that used in modern television.

More specifically it is proposed in accordance with the present invention to provide a system of triangulation in space in which a triangle has its base located on the airfield and in relationship to the runway upon which an airplane is to alight and which triangle has its apex located on the airplane, and to provide means on the airplane whereby the location of a lighted spot on the fluorescent screen with respect to a fixed point thereon manifests the difference in length between the two lines connecting such apex on the airplane and the two ends of the base line on the airfield. In accordance with this specific proposal it is proposed to employ two such triangles the airfield located base lines of which are at right angles to each other. Also, the airplane defined by such base line is preferably at right angles to the proposed glide path so that the pictorial representation on the fluorescent screen is in two dimensions as distinguished from being along a line on such screen as would be the case if only single triangulation arrangements were employed.

Another specific object of the present invention proposes the employment of radio waves emitted from the ends of the base lines on the airfield and which radiate to and are received at the apex on the airplane. In order to measure the difference in the lengths of the two lines joining such apex and the ends of base line on the airfield it is proposed to radiate energy of the same frequency from radiators located at the ends of such base line and to distinctively detect these two radio energies of the same frequency on the airplane by having these radio energies polarized in planes at right angles to each other. Since both of these radio energies are to be received at the same point on the airplane it is further proposed to employ two polarized antennas for distinctively detecting radio energy polarized in planes at right angles to each other and located to have these two antennas concentric.

Other objects, purposes and characteristic features of the present invention will be obvious from the following description and will in part be obvious from the accompanying drawings, in which.

Figure 1:
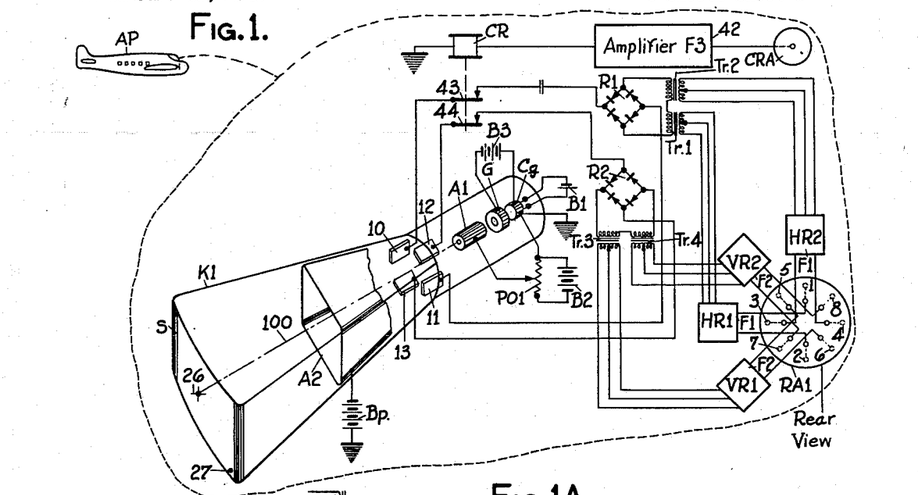
Fig. 1 illustrates conventionally airplane carried apparatus embodying the present invention.

*Structure.—Figs. 1-14.*—Referring to Fig. 1 of the drawings in which there has been illustrated a cathode-ray tube K1 the electron beam 100 of which creates a display on its fluorescent screen S in accordance with radio energy received by the compound polarized receiving antenna RA1. This cathode-ray tube also includes the usual electron gun including a cathode Cg, heated by a filament energized from battery B1, a grid G permanently energized from a source B3, a first anode A1 constituting an electron focusing device whereby the electrons passing therethrough may be focused into a small diameter beam to an extent determined by the contact on the potentiometer PO1 energized from a battery B2, and having a second anode A2 energized by high potential from a source Bp. This cathode-ray tube K1 also includes horizontal sweep plates 10 and 11 and vertical sweep plates 12 and 13.

The receiving antenna RA1 is preferably a focused receiving antenna having a radio reflector of a shape to receive radio energy through a comparatively wide angle such as 90°. As shown in Fig. 1 this receiving antenna RA1 is viewed from the rear. It is provided with four dipoles of which the vertically disposed dipole 1—2 cooperates with the transmitting dipole 1—2 of Fig. 2A; of which the horizontal dipole 3—4 cooperates with the horizontal transmitting dipole 3—4 illustrated in Fig. 2B; of which the dipole 5—6 of receiving antenna RA1 cooperates with the transmitting dipole 5—6 shown in Fig. 2C; and of which the receiving dipole 7—8 of Fig. 1 cooperates with the transmitting dipole 7—8 shown in Fig. 2D of the drawings. It will be observed that dipoles 5—6 are disposed at right angle to dipoles 7—8.

Referring to Figs. 2A-2D for a moment it may be pointed out that it is contemplated to have the two horizontal transmitting antennas HTA1 and HTA2 energized by ultra-high radio energy of one frequency whereas the vertical transmitting antennas VTA1 and VTA2 are contemplated being energized by ultra-high frequency radio energy of a different frequency. In other words, the two radio transmitters energized by one radio frequency have their dipoles arranged at right angles to each other in a vertical and horizontal plane respectively whereas the two other dipole transmitting antennas 5—6 and 7—8 have their dipoles juxtaposed at an angle of 45° with respect to the horizontal but at an angle of 90° with respect to each other. Each of these dipole radio transmitters has a cooperating receiving dipole included in the multiple concentric or compound dipole radio receiving antenna RA1, a back view of which is illustrated in Fig. 1 of the drawings. It will be seen that all of these four airplane carried dipole antennas have a common center.

Figures 2, 2A, 2B, 2C, 2D, 2E:
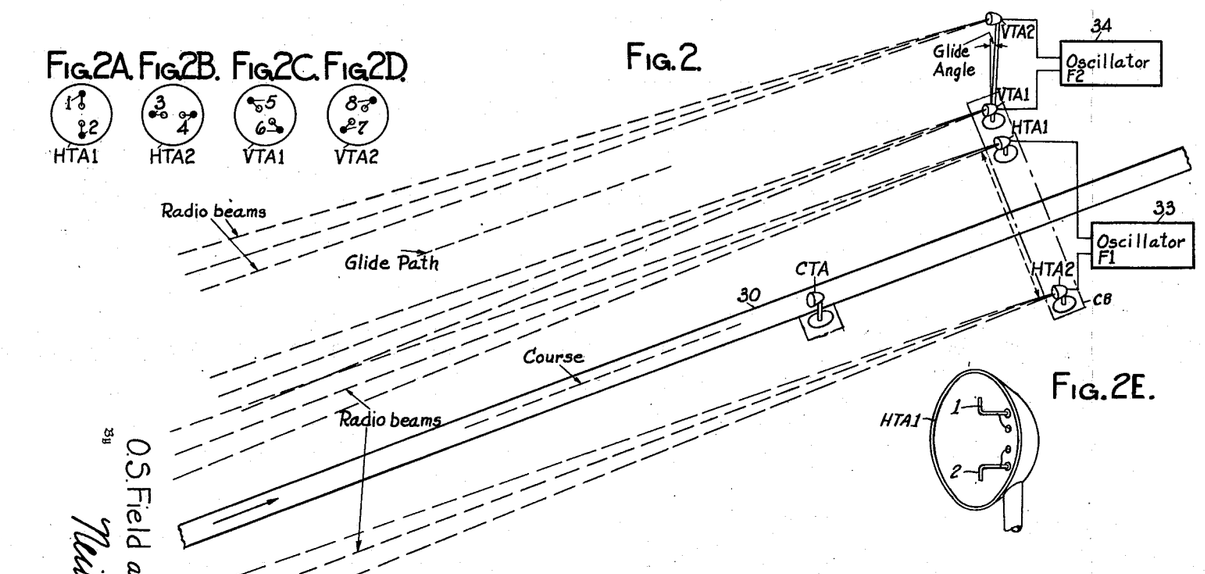
Fig. 2 shows an airfield provided with the ground located apparatus which is to cooperate with the airplane carried apparatus illustrated in Fig. 1 and with slight modification with the airplane carried apparatus illustrated in Fig. 17.
Figs. 2A, 2B, 2C and 2D illustrate the planes of polarization of the transmitting antennas shown in Fig. 2.
Fig. 2E illustrates in perspective and on an enlarged scale the antenna HTA2 also shown in Fig. 2A.

Referring again to Fig. 1 each of the dipole receiving antennas has connected thereto a tuned radio receiver and amplifier, including volume control apparatus. These radio receivers have been designated HR1, HR2, VR1 and VR2 and it will be seen that the receiver HR1 (Fig. 1) is in communicating relationship with the transmitting antenna HTA1 (Fig. 2A), that the receiver HR2 (Fig. 1) is in communicating relationship with the transmitting antenna HTA2 (Fig. 2B), that the receiver VR1 (Fig. 1) is in communicating relationship with the transmitting antenna VTA1 (Fig. 2C), and that the receiver VR2 (Fig. 1) is in radio communicating relationship with the transmitting antenna VTA2 (Fig. 2D).

Figure 1A:
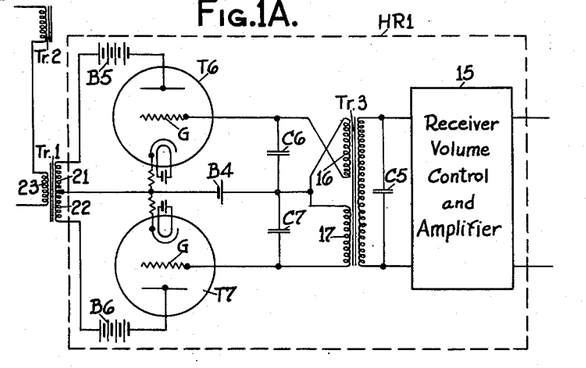
Fig. 1A shows one of the radio receivers illustrated in Fig. 1 in more detail.
Figures 1B, 1C:
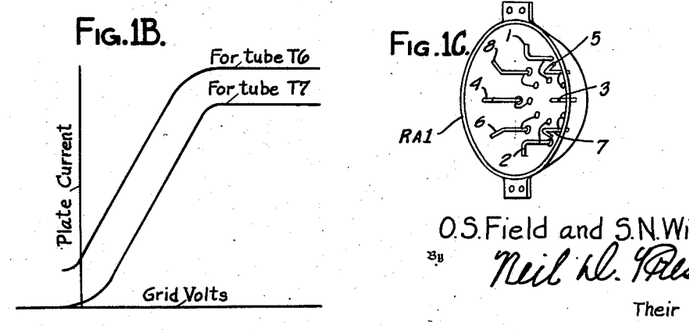
Fig. 1B shows amplifier tube current characteristics of electronic tubes employed in the volume control apparatus of the radio receivers illustrated in Figs. 1 and 1A.
Fig. 1C illustrates in perspective and on an enlarged scale the compound antenna RA1 also shown in Fig. 1.

Referring to the radio receiver and amplifier HR1 illustrated in Fig. 1 and shown more in detail in Fig. 1A, this radio receiver in addition to the usual receiving amplifying and volume control apparatus conveniently illustrated in the block 15 supplemental volume control apparatus including a transformer Tr3 is provided. The receiver-volume control-amplifier 15 feeds the primary winding of the transformer Tr3 and the secondary windings 16 and 17 of this transformer feed the grids G of amplifier tubes T6 and T7. The primary winding of this transformer Tr3 is tuned to the proper frequency through the medium of a condenser C5. The secondary windings 16 and 17 of this transformer Tr3 are also individually tuned by condensers C6 and C7 respectively. In the plate circuit of these amplifying tubes T6 and T7 are included plate batteries B5 and B6 respectively. These plate batteries B5 and B6 apply different plate voltages to the amplifying tubes T6 and T7, these plate voltages and the voltage of grid bias battery B4 being so chosen that the characteristic curves of plate current as compared with grid voltage is such that the difference in plate current between the two tubes is substantially the same even though there is variation in the volume of radio energy applied to the grids of the tubes T6 and T7. These characteristic curves for the tubes T6 and T7 have been tentatively illustrated in Fig. 1B of the drawings. From Fig. 1B it is readily seen that these tubes T6 and T7 constitute a second volume control apparatus, so that the net output in the secondary winding 23 of the transformer Tr1 is substantially the same irrespective of the volume of radio energy received by the receiving antenna RA1, it being understood that the primary windings 21 and 22 of this transformer Tr1 are connected in the plate circuits of the amplifying tubes T6 and T7 respectively.

Referring again to Fig. 1 of the drawings, each of the receivers HR2, VR1 and VR2 are similarly constructed to the receiver HR1 more specifically shown in Fig. 1A of the drawings. From this construction it is seen that receiver HR2 is provided with a transformer Tr2, the receiver VR1 is provided with a transformer Tr3, and the receiver VR2 is provided with a transformer Tr4. The secondary windings of transformers Tr1 and Tr2 are connected in series as are also the secondary windings of the transformers Tr3 and Tr4.

As more fully pointed out hereinafter the radio transmitting antennas HTA1 and HTA2 (Figs. 2, 2A and 2B) are energized by ultra-high frequency radio potentials which are displaced substantially 90° in phase with each other so that the energies received by the receivers HR1 and HR2 (Fig. 1) deliver energies to their respective transformers Tr1 and Tr2 which are of the same frequency and similarly displaced in phase. Since the secondary windings of these transformers Tr1 and Tr2 in series deliver a potential to the full-wave rectifier R1 the vector sum of this energy is of medium value if no other phase displacement has taken place during the course of radio transmission. If the distance from one of the transmitting antennas HTA1 or HTA2 is longer than the distance to the other to an extent of ¼ wave length in one direction, then the energies received by the receivers HR1 and HR2 are in phase opposition and are zero, and if the other distance is longer by ¼ wave length the energies received by the receivers HR1 and HR2 are in exact phase and the energy delivered to the rectifier R1 is a maximum. In other words, the energy received by the full-wave rectifier R1 may be medium energy (normal), may be zero energy, or may be maximum energy depending on the phase relationships between the radio energies received by the dipoles 1—2 and 3—4 of the receiving antenna RA1. In a similar way as the secondary windings of transformers Tr1 and Tr2 feed the full-wave rectifier R1 the transformers Tr3 and Tr4 feed the full-wave rectifier R2.

It will be seen that the rectifier R1 applies its output voltage to the horizontal sweep plates 10 and 11 whereas the rectifier R2 supplies its output voltage to the sweep plates 12 and 13. The cathode-ray tube K1 may have its electron beam normally biased to the lower right-hand corner of the screen S, as shown by the spot 27, in any suitable manner, as for instance by so directing the electron gun or by continuously applying suitable biasing voltages to the sweep plates. In any event, the electron beam will be directed to the spot 27 on the screen S (Fig. 1) when no voltage is delivered by the rectifiers R1 and R2, and will be directed to the cross 26 when normal output energy is delivered by the rectifiers R1 and R2. By normal energy is meant the output energy from rectifiers R1 and R2 which results from the reception of radio energies by the horizontal receivers HR1 and HR2 which are displaced in quadrature and from the reception of radio energies by the vertical receivers VR1 and VR2 which are also displaced in quadrature.

Referring now to Fig. 2 of the drawings, in this view is shown an airport or landing field including a landing strip 30 which has located on opposite sides and near the entrance end thereof horizontal transmitting antennas HTA1 and HTA2 and has located at the same point but to one side thereof vertical transmitting antennas VTA1 and VTA2. All of these antennas HTA1, HTA2, VTA1 and VTA2 are preferably supported on a common concrete base AB. As already pointed out, the radio transmitting energies for the horizontal and the vertical antennas must be of different wave-length and frequency so that they may be separated by tuning of the receiving apparatus carried on the airplane and shown in Fig. 1. As shown in the drawings the horizontal transmitting antennas have for convenience been spaced farther apart than have the vertical transmitting antennas and this has been done by reason of the fact that great spacing of the horizontal antennas is more easily accomplished. The spacing between horizontal antennas and spacing between vertical antennas are different to the same extent that the wave lengths of the radio energies emitted by these horizontal and vertical transmitting antennas respectively are different from each other. That is, the spacing of the horizontal transmitting antennas HTA1 and HTA2 is to the spacing of the vertical transmitting antennas VTA1 and VTA2 as is the wave length of the radio energies transmitted by the horizontal transmitting antennas HTA1 and HTA2 is to the wave length transmitted by the vertical transmitting antennas VTA1 and VTA2. The horizontal transmitting antennas are preferably so mounted that their focal points are in a horizontal plane whereas the vertical antennas VTA1 and VTA2 although they are in a vertical plane parallel to the landing strip do not have their focal points in an exact vertical plane crosswise of the landing strip but have them in a plane which leans backwardly to the same degree that the glide path makes with a perfectly horizontal plane. In other words, if it is desired to have the glide path make an angle of 3° with the horizontal then a line drawn through the focuses of the vertical transmitting antennas VTA1 and VTA2 must also make an angle of 3° with a vertical plane drawn crosswise through the runway 30 and through one of these antennas VTA1 or VTA2.

Referring again to Fig. 2 it is now apparent that the locus of points which are equal distances from the four transmitting antennas HTA1, HTA2, VTA1 and VTA2 will extend from the center of the rectangle formed by these antennas outwardly over the landing strip 30 and will incline at an angle of say 3°. This is on the assumption that an airplane passing through the focal points of all the antennas makes an angle of 3° with a vertical plane crosswise of the landing strip 30. As illustrated the horizontal antennas HTA1 and HTA2 are energized by ultra-high frequency radio energy of frequency F1 received from the oscillator 33 whereas the vertical antennas VTA1 and VTA2 are energized by ultra-high frequency energy of frequency F2 generated by the oscillator 34. Furthermore, the energies emitted by HTA1 and HTA2 are displaced in phase to the extent of 90° as is also true of the energies emitted by antennas VTA1 and VTA2.

Figure 3:
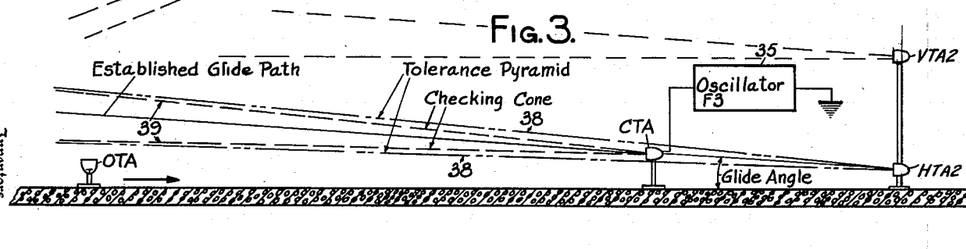
Fig. 3 illustrates a side elevation of the airfield located apparatus illustrated in Fig. 2.

In addition to the four transmitting antennas HTA1, HTA2, VTA1 and VTA2 there is also provided an outer marker radiator OTA (see Fig. 3) and a checking transmitting antenna CTA (Fig. 3). This checking antenna CTA is preferably energized by radio frequency of still a different carrier frequency F3 derived from oscillator 35. It may be pointed out that the checking transmitting antenna CTA is of a more sharply focused type and emits a radio beam which is slightly narrower than the imaginary tolerance pyramid defined by the dot-and-dash tolerance lines 38 (Fig. 3) as conventionally shown by the dash lines 39 defining the radio energy checking cone emitted by the checking transmitter CTA. It may be pointed out that this tolerance pyramid conventionally shown by the dot-and-dash lines 38 constitutes that portion of space where the electron beam in the cathode-ray tube K1 falls within the prescribed limits of the normal position indicated by cross 26. In other words, as an airplane descends down a glide path and as it swerves off of this glide path the distances from the receiving antennas RA1 (Fig. 1) to the horizontal transmitting antennas HTA1 and HTA2 will become different as is also true of the distances to the vertical antennas VTA1 and VTA2 depending upon whether the airplane swerves horizontally off of the glide path, swerves vertically off of the glide path, or does both, and it is the limits of swerving off of the glide path which are permitted in accordance with instructions issued to the pilot that determine the dimensions of the tolerance pyramid defined by dot-and-dash lines 38 (Fig. 3).

It may be pointed out that the checking transmitting antenna CTA and the associated oscillator 35 have been provided to control the checking relay CR (Fig. 1) so that if the pilot swerves out of the beam emitted by this checking transmitting antenna CTA the checking relay CR is deenergized. In this connection it should be observed that the check relay CR is controlled by energy received from the amplifier 42 which in turn is activated by energy received from the checking receiving antenna CRA located on the airplane. The receiver 42 is of course tuned to the frequency F3 generated by oscillator 35 (Fig. 3). In this connection it should be observed that the check relay CR is provided with contacts 43 and 44 which are included in the horizontal and the vertical sweep plate circuits respectively. From this consideration it is readily apparent that if the pilot in attempting to make a landing does not stay in the checking cone defined by dot-and-dash lines 39 (Fig. 3) the checking relay CR (Fig. 1) is deenergized and the electron beam returns to its normal or noncontrolled position as indicated by the spot 26 on the screen S of the cathode-ray tube K1 (Fig. 1). This feature of applicants' invention is optional and is resorted to to assure against an airplane swerving away from a glide path to an extent to compare phase relationship between radio currents received which are in different cycles rather in the same cycle. The difference between lengths of lines in the imaginary triangle as contemplated in the triangulation system of the present invention of course requires this difference in the length of these lines to be less than ¼ cycle in both the plus and minus direction.

Figure 6:
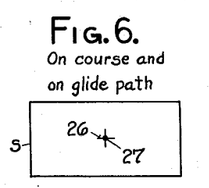
Figure 7:
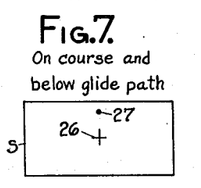
Figure 8:
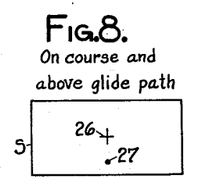

*Operation*.—Figs. *1–14*.—Let us assume that an airplane AP (Fig. 1) equipped with the apparatus shown in Fig. 1 is about to make a landing on an airfield such as shown in Fig. 2. This airplane is preferably provided with suitable route flying apparatus which may include in addition to the airplane carried apparatus shown in Fig. 1 apparatus such as disclosed in our prior applications, Ser. No. 517,814 and Ser. No. 547,175, filed Jan. 11, 1944, and July 29, 1944, respectively, the latter being patented, Patent No. 2,458,361 dated January 4, 1949. The pilot of the airplane will of course orient himself properly in space the distance from runway 30 being determined by the outer fan marker OTA (Fig. 3). This marker is preferably located about two miles from the landing strip 30 (Fig. 2). The pilot will line himself up so that the outer marker OTA and the inner marker CTA (Fig. 3) are in alignment with him and each other. The pilot will also attempt to fly at an altitude at this point over the outer marker OTA commensurate with the angle of the glide path used which for convenience may be assumed to be a 3° glide path. By such maneuver the pilot will of course be within the checking cone defined by dash lines 39 so that his checking relay CR (Fig. 1) will assume its energized position. Under this condition the airplane AP will approach within the tolerance pyramid defined by tolerance lines 38 (Fig. 3) so that the electron beam of the cathode-ray tube K1 (Fig. 1) will be located somewhere within tolerance distance from the center cross 26 on the screen S. The nearness of the spot 27 created by the electron beam to this cross 26 depends of course upon the nearness of the receiving antenna RA1 on the airplane to the glide path locus heretofore mentioned. In other words, if the triangle defined by the base line connecting the horizontal antennas HTA1 and HTA2 and the lines of radio reception from these antennas is an equilateral triangle the electron beam spot 27 will be on a vertical line passing directly through the cross 26 as shown in Figs. 6, 7 and 8 of the drawings. If, however, the airplane flies below this locus the spot 27 will be above the cross 26 as shown in Fig. 7 of the drawings, this being due to the fact that the airplane receiving antenna RA1 is nearer to the transmitting antenna VTA1 than it is to the transmitting antenna VTA2, this difference, however, being less than ¼ cycle or wave length distance for the particular radio energy transmitted by these transmitting antennas VTA1 and VTA2. If on the other hand, the airplane flies on course but above the glide path the spot 27 will be located below the cross 26 as shown in Fig. 8 of the drawings.

Figure 9:
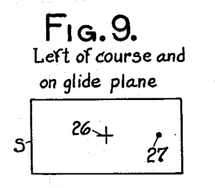
Figure 10:
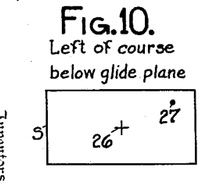
Figure 11:
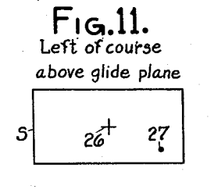
Figure 12:
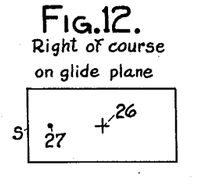
Figure 13:
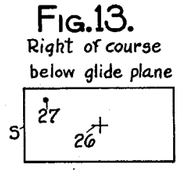
Figure 14:
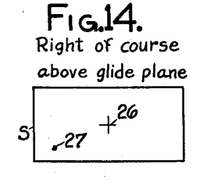

If the airplane now flies on the glide plane but to the left of the course then the spot 27 will be located directly to the right of the cross 26 as shown in Fig. 9 of the drawings. If now the airplane flies below the glide plane and to the left of the course the spot 27 will be located on the screen S toward the right and above the cross 26 as shown in Fig. 10 of the drawings. If now the airplane flies to the left of the course and above the glide plane the spot 27 will be below and to the right of the cross 26 on the screen S as show in Fig. 11 of the drawings. If the airplane is on the glide plane but to the right of the course the spot 27 will be to the left but on the horizontal line passing through the cross 26 as shown in Fig. 12 of the drawings. Similarly, if the airplane is to the right of the course but below the glide plane the spot 27 will be located to the left of the cross 26 and above the same as shown in Fig. 13. If the airplane flies to the right of the glide path or course and above the glide plane the spot 27 will be located to the left and below the cross 26 on the screen S as shown in Fig. 14 of the drawings. In other words the spot 27 defines the glide path and the cross 26 defines the location of the airplane with respect thereto.

Figure 4:
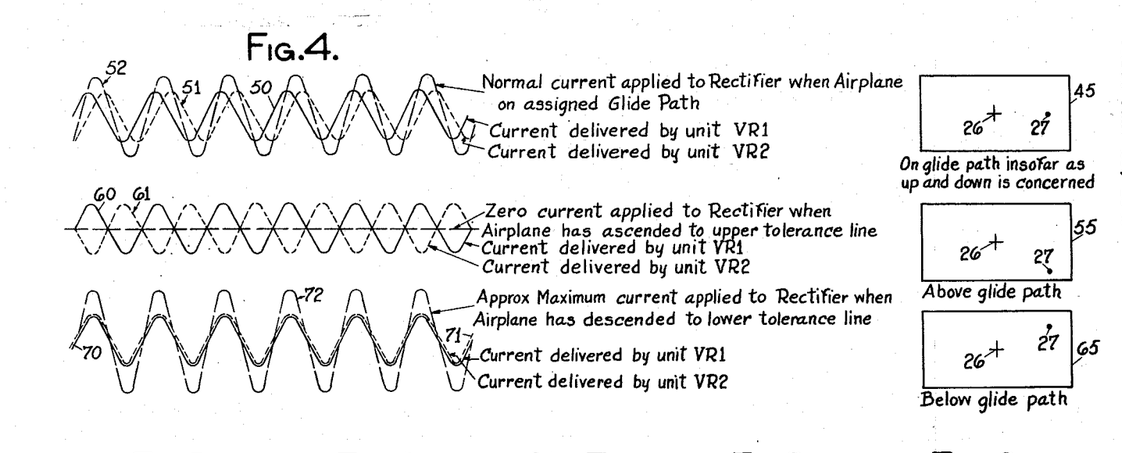
Fig. 4 illustrates phase relationships of radio energies received on the airplane under various conditions of juxtaposition of this airplane with respect to the proposed glide path and illustrates how these radio energies may be vectorially added and result in a current of magnitude dependent upon their phase relationship and in turn upon the distances to the two associated ground located radiators.
Figure 5:
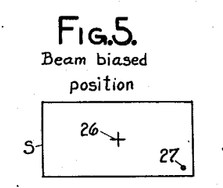
Figs. 5-14 illustrate various indications on the fluorescent screen of the cathode-ray tube and each contains a brief description as to what that indication represents.

In order to get a better understanding of how the lighted spot 27 is caused to take different positions on the screen S of the cathode-ray tube K1 as the airplane moves in different directions off the glide path attention is directed to Fig. 4 of the drawings. In the top portion of Fig. 4 have been shown graphs 50 and 51 illustrating alternating radio currents received by the receivers VR1 and VR2 respectively. The vector sum component of these currents have been illustrated by the graph 52. In this case the airplane is on the glide path insofar as vertical displacement is concerned, and the radio currents received are displaced substantially 90°, so that the summation current indicated by graph 52 is of substantially the average value, although it is a little larger than average, as graphically indicated in Fig. 4, the lighted spot 27 being located as shown on the screen 45 in Fig. 4.

If now the graph 51 will be caused to lag still more behind the graph 50 it will eventually lag 180° as shown by the graphs 60 and 61 in Fig. 4 of the drawings. In this case there is no summation current and in this case the spot 27 will be at its electron beam biased position as shown on the screen 55 in Fig. 4 of the drawings. If, on the other hand, the radio energy received by the receiver VR2 and indicated by the graph 51 in Fig. 4 of the drawings begins to lead to an extent as shown by the graph 71 with respect to the graph 70 (Fig. 4) these two graphs will get substantially into phase so that the summation component 72 will be a maximum, as shown by graph 72. This maximum radio frequency current will be rectified by the rectifier R2 (Fig. 1) and will be applied to the vertical sweep plates 12 and 13 to cause the electron beam to be lifted to its maximum height position as shown by the dot 27 on screen 65 in Fig. 4 of the drawings. It is of course understood that the vector sum of these currents is a result of the fact that the secondary windings of transformers Tr1 and Tr2 are connected in series.

Putting this in different words, if the airplane is flying at a point to cause the electron spot 27 to be directly on the cross 26 (Fig. 6) it is an assurance that both sets of the radio currents received are displaced in phase 90° and that the airplane is flying down the glide path as defined by the locus of points heretofore mentioned. The pilot will therefore so maneuver his airplane as to hold the lighted spot 27 directly on the cross 26, or as near thereto as possible, and if he does this his airplane will follow a precise locus of spots determined by two equilateral triangles defined by four radio beams and two base lines on the airfield.

It is readily seen that the farther the airplane is from the base lines defined by a horizontal line connecting the two horizontal antennas HTA1 and HTA2 and the vertical line connecting the two vertical antennas VTA1 and VTA2 the greater the extent to which he may maneuver his airplane for a specific movement of the spot 27 on the screen. That is, he has more freedom of maneuvering his airplane the farther he is away from the landing strip 30 (Fig. 2). In practice the radio frequencies and the length of these base lines are so chosen that the tolerance pyramid (lines 38, Fig. 3) defining his freedom of maneuverability is such that the pilot may easily enter this cone and it is readily seen that the extent to which he may deviate from the glide path diminishes as he approaches the landing strip 30. These base line lengths and frequencies are also preferably so chosen that every cross-section through this tolerance pyramid perpendicular to the glide path is a square. In other words, the airplane may deviate in any direction from the glide path to an extent of many hundreds of feet when the airplane is two miles from the landing strip, whereas he may only deviate a matter of feet or inches from this glide path as he approaches the landing strip. This is a desirable feature of applicants' invention in that the nearer the airplane approaches to the landing strip the more sensitive his detecting apparatus becomes so that the pilot must very carefully maneuver his airplane as he approaches the landing strip in order not only to keep his spot 27 on the cross 26 but also to keep his spot 27 on the screen S itself.

Figure 16:
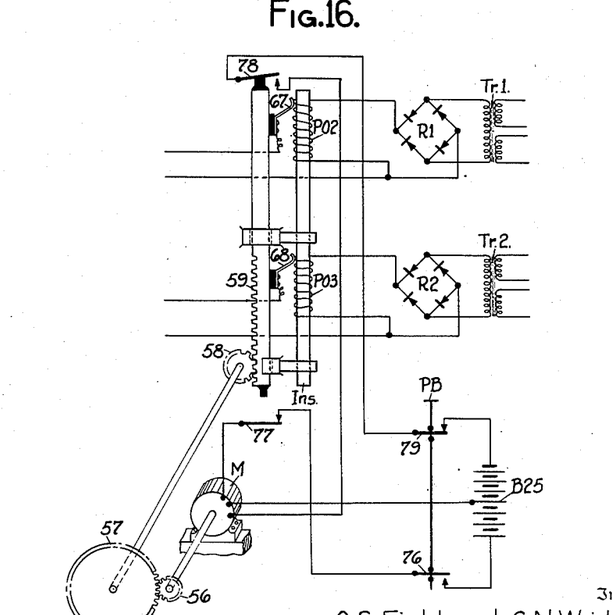
Fig. 16 illustrates means for changing the sensitivity of the receiving apparatus gradually and in accordance with the lapse of time.

If the apparatus as thus far described is more sensitive than desired especially as the pilot approaches the landing strip, it may be desirable to include means whereby the apparatus becomes more sensitive more slowly as the airplane approaches the landing strip. For this purpose if desired potentiometers PO2 and PO3, shown in Fig. 16 of the drawings, may be provided for gradually adjusting through the medium of a timing motor M the effectiveness of the potentials delivered by the rectifiers R1 and R2. Such a structure is shown in Fig. 16 of the drawings. It is readily seen that the potentiometers PO2 and PO3 gradually reduce the relative voltage applied to the sweep plates 10—11 and 12—13 respectively as the motor M, through the medium of pinion 56, gear 57, pinion 58, and rack 59, operates two movable contacts 67 and 68 to lower positions on the potentiometers PO2 and PO3. In this connection, the pilot may depress the push button PB either when he flies over the outer marker OTA (Fig. 3), or at some point beyond this marker, to thereby cause the motor M to be operated in a direction to move the rack 59 downwardly together with its contacts 67 and 68. The circuit for causing this rack 59 to be moved downwardly by the motor M may be traced from the terminal (—) of the battery B25 through contact 76 of the push button PB, limit contacts 77, through the winding of the motor M and back to the mid-point of the battery B25. If the push button PB is held depressed too long the rack 59 will engage the limit contact 77 and open the motor circuit. In other words, the contacts 77 and 78 constitute limit switches for the motor M, whereas the contacts 76 and 79 are part of the push button PB and contacts 67 and 68 constitute part of the potentiometers PO2 and PO3. Although the contacts 76 and 79 have been shown on a push button PB which is presumably of spring biased type if desired this push button PB may be of the non-biased type which will in practice be depressed by the operator when he starts his glide down the glide path and which will again be pulled out after his landing operation has been completed. If the push button PB is of the spring return type the operator must continue to hold his push button down during his descent in making a landing operation if he desires to reduce the rate of increased sensitivity to the fullest extent. Obviously, the motor M may be dispensed with and the rack, or other suitable means, may be operated manually as desired.

Although little has been said about visibility in making a landing it is of course understood that this apparatus has been particularly provided to enable airplanes to do route flying or to make a landing during severe fogs and snow storms which cannot be penetrated by visible light. Radio energy lends itself admirably to penetration of snow and fog.

It is readily understood that if the ground located landing apparatus shown in Fig. 2 were provided, say, every five miles, along a route it would enable a pilot equipped with the apparatus shown in Fig. 1 to obtain the necessary route flying information. Under these circumstances the pilot would not try to keep the lighted spot 27 on the cross 26 of the screen but would continue his flight at the proper fixed altitude as determined by his altimeter (not shon). In this case the lighted spot 27 would be held on a vertical line passing through cross 26, this spot gradually disappearing at the bottom of the screen which would be followed by a new spot 27 due to the next ground location appearing at a higher point on this vertical line on the screen S.

Figure 17:
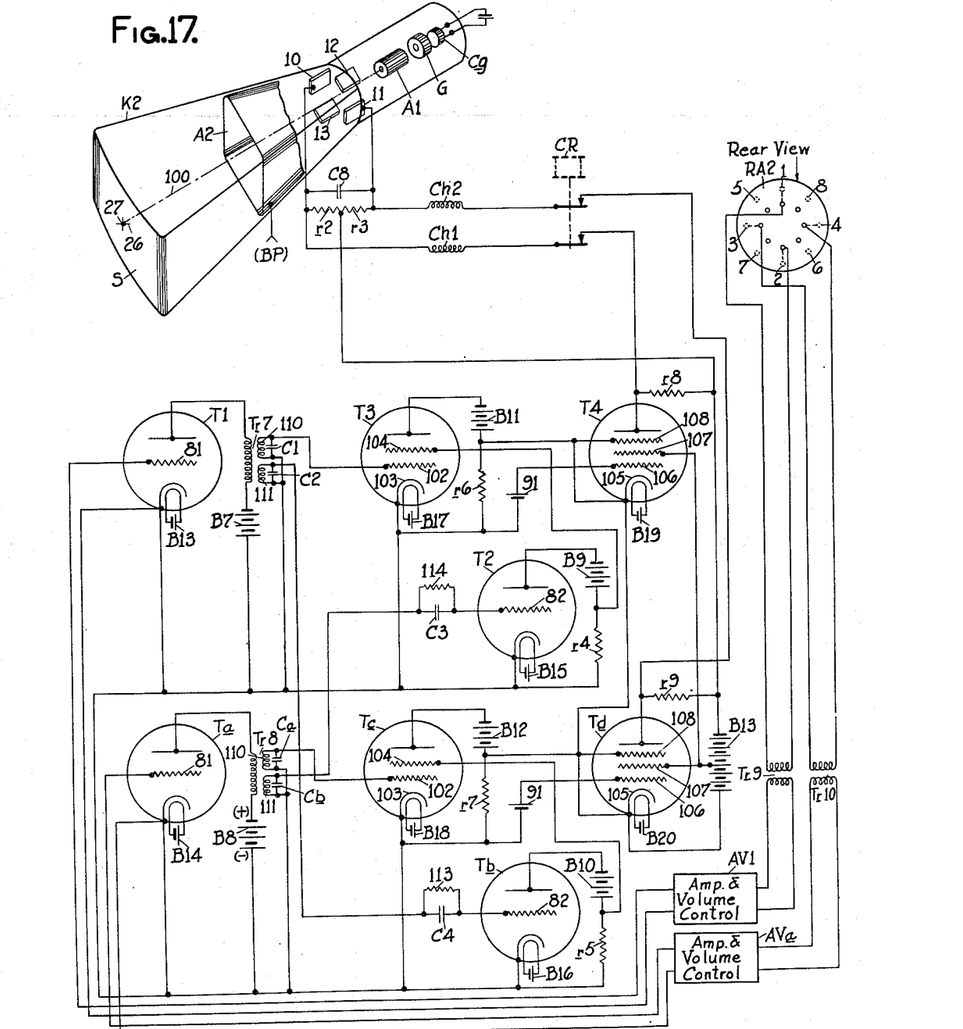
Fig. 17 shows a modified system of airplane carried apparatus which may cooperate with the ground located apparatus illustrated in Fig. 3 provided that the radio energies radiated from the ground located transmitters are transmitted in exact phase instead of being transmitted in quadrature.

*Structure.— Figs. 17–20.*—In Fig. 17 has been shown a modified form of the invention in which the detection of phase displacement between the radio currents received from the horizontal transmitting antennas HTA1 and HTA2 or from the vertical transmitting antenas VTA1 and VTA2, as the case may be, is not determined by integrating the currents as is true of the form shown in Fig. 1 of the drawings but instead this phase displacement between the received radio currents is determined by having the direct current pulses due to rectification of one of these radio currents wholly or partially blank out the unidirectional pulses due to rectification of the other radio current. Stating this somewhat more specifically the radio current received from the horizontal transmitting antenna HTA1, for instance, is detected or rectified whereas the radio current detected from the associated radio transmitting antenna HTA2 is not only detected but the rectified pulses are also drawn out so as to continue for a longer time than do the rectified pulses of the first mentioned radio current. By employing this principle it is possible to have the second mentioned and drawn out rectified pulses constitute blanking pulses for blanking out the first mentioned uni-directional pulses, as through the medium of a suppressing grid of an amplifier tube, not only when these currents are in phase but also if the phase shift is in a particular direction. The same procedure is also followed as to the second radio current with respect to the first.

With this brief statement of purpose, the apparatus disclosed in Fig. 17 of the drawings will now be specifically described. Before describing the structural details of Fig. 17 it is desired to point out that the apparatus shown therein is intended to cooperate with the ground located apparatus shown in Fig. 2 of the drawings with the exception that the apparatus in Fig. 2 in this case is modified to the extent of having the radio frequency energies which are applied to the horizontal transmitting antennas HTA1 and HTA2 in exact phase instead of having them displaced 90° in phase as is necessary for the apparatus shown in Fig. 1. What has been said about the horizontal transmitting antennas emitting energy which is in phase is also true of the vertical transmitting antennas VTA1 and VTA2, for obvious reasons. The horizontal antennas of course are energized by radio currents of different frequency than that applied to the vertical antennas.

Referring to Fig. 17 the cathode-ray tube K2 is of exactly the same construction as is the cathode-ray tube K1 shown in Fig. 1 of the drawings with one exception, namely, the electron gun of the cathode-ray tube K2 is so juxtaposed within the tube that the electron beam shown by dot-and-dash line 100 is directed to the middle of the screen S and directly on the cross 26 when the sweep plates are deenergized instead of being directed to the lower right-hand corner of the screen as was true of the cathode-ray tube K1 of Fig. 1. This is necessary because the circuit structure of Fig. 17 is such that no energy will be applied to the sweep plates 10—11 and 12—13 when the airplane is on the glide path and the energies received are in phase. The receiving antenna RA2 is the same as the receiving antenna RA1 shown in Fig. 1 so that no further description thereof is necessary. This receiving antenna RA2 has been shown as viewed from the rear so that it is easier to compare a particular dipole of this receiving antenna with the transmitting dipole with which it cooperates and shown in one of Figs. 2A, 2B, 2C or 2D.

Two identical sets of electronic amplifier tubes one for each beam are employed, the tubes of the first set have been designated T1, T2, T3 and T4 whereas the tubes of the second set have been designated Ta, Tb, Tc and Td. These sets are used for the radio beams for horizontal deflection, two similar sets being provided for vertical indication. Of these tubes the tubes T1 and Ta are the usual triode amplifying tubes for amplifying the ultra-high frequency alternating current energy received from the amplifier-volume control units AV1 and AVa, respectively. The tubes T2 and Tb are triode amplifiers which are provided with such plate voltage and grid bias that they function like a Class B amplifier, that is, the grids are so biased that cut-off takes place at zero applied grid control voltage. These amplifier tubes T2 and Tb not only function as amplifiers but also function as rectifiers. The tubes T3 and Tc are tetrodes in that they are provided with the usual control grid 102 adjacent the cathode 103 and are provided with a suppressor grid 104. These tubes are also provided with such plate energy and grid bias that they function like a Class B amplifier and respond only to grid control voltage of plus polarities. The tubes T4 and Td are amplifiers of the pentode type in which the control grids have been designated 106, the screen grids have been designated 107, and the suppressor grids have been designated 108. These tubes T4 and Td are primarily provided for direct current amplifying purposes and are also preferably biased to function as Class B amplifiers.

Energy derived from the dipole 1—2 is applied to the input side of the amplifier and volume control unit AV1 through the medium of a transformer Tr9 from whence it is applied to the triode T1, whereas the dipole 3—4 is connected to the input side of the triode Ta through the medium of the transformer Tr10 and amplifier-volume control unit AVa. The plate circuit of the triode amplifier T1 is energized from a plate battery B7 and has included in series therein the primary winding of a transformer Tr7. This transformer Tr7 is provided with secondary windings 110 and 111 which windings are tuned to resonate to the radio frequency energy employed through the medium of condensers C1 and C2. The output of the secondary winding 110 of the transformer Tr7 is applied to the control grid 102 of the tetrode T3 whereas the output from the secondary winding 111 of the transformer Tr7 is applied through a circuit including the condenser C4 to the grid of the triode Tb.

Figure 18:
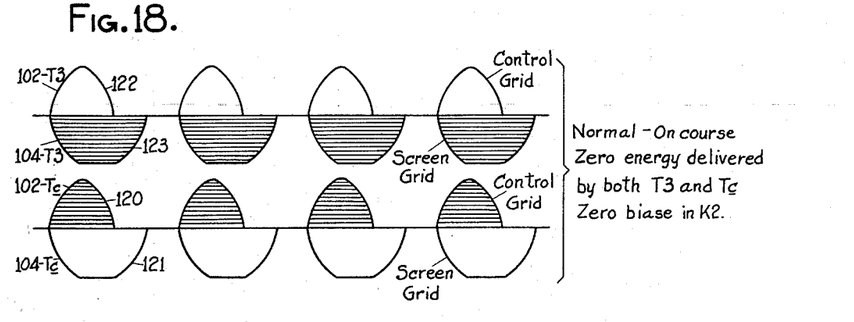
Figs. 18, 19, and 20 illustrate graphically radio potentials and phase relationships to illustrate the functioning of the airplane carried apparatus illustrated in Fig. 17 under three kinds of juxtaposition of the airplane in a horizontal direction with respect to the proposed glide path.
Figure 19:
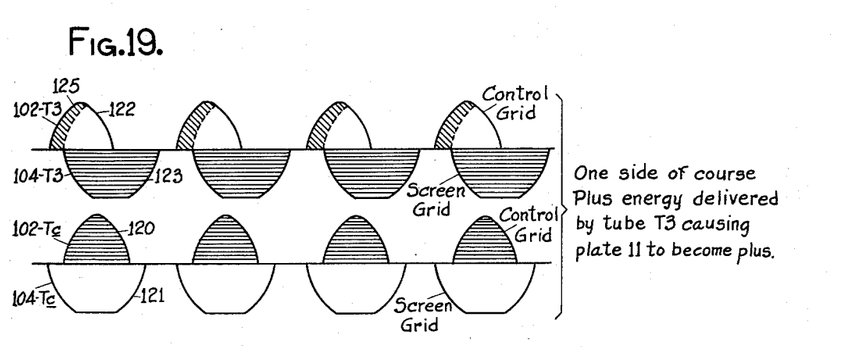
Figure 20:
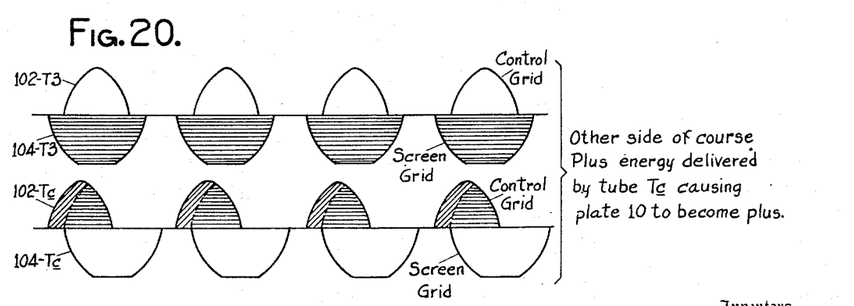

This condenser C4 is shunted by a resistance 113 and is provided in the grid circuit to cause the positive pulse of the voltage generated in secondary winding 111 of transformer Tr7 to be prolonged to an appreciable extent beyond the end of that half cycle of the alternating current voltage (see Figs. 18–20). As will appear later this prolongation of the activation of the grid of tube T2 from the secondary winding 111 of transformer Tr8, both sets of tubes being similarly cross connected, results in the application of a prolonged suppressing impulse on the suppressor grid 104 of the tetrode T3, whereby this suppressor grid 104 may not only suppress all inphase positive pulses of current applied to the control grid 102 of tube T3 with respect to positive pulses applied to grid 102 of tube Tc but also is capable of suppressing a portion of the positive pulses of lagging current but is incapable of suppressing any portion of the positive pulses of leading currents.

In a similar manner as the triode Tb is controlled from the secondary winding 111 of transformer Tr7, the triode T2 is controlled from the secondary winding 111 of the transformer Tr8, a condenser C3 shunted by a resistance unit 114 being included in series in the grid circuit of tube T2. The plate circuit for the tetrode T2 includes a plate battery B9 and the usual series resistance r4, except that this series resistance is included between the cathode of tube T2 and this plate battery B9. The suppressing grid 104 of the tetrode T3 is connected to the junction point between battery B9 and the resistance unit r4. This construction is employed to prevent the voltage of plate battery B9 being applied to grid 104. The tubes Tb and Tc are similarly connected, the series resistance in the plate circuit of tube Tb having been designated r5. The triode tubes T2 and Tb are respectively provided with plate battery B9 and B10 and have included in series in the plate circuits the series resistance r4 and r5 respectively. The tubes T3 and Tc derive their plate energy from the plate batteries B11 and B12, respectively.

Since the pentodes T4 and Td are intended to amplify only direct current pulses and since these pulses are to be reproduced in exact form it is important that the control grids 106 of these tubes be so connected to the plate circuits of their next preceding tubes T3 and Tc, respectively, in such manner that grid 106 will go positive when current flows in the next preceding tube. In order to accomplish this these pentodes T4 and Td have been raised to a higher potential plane than is ordinarily the case, that is, the cathode 105 of tube T4, for instance, is directly connected to the junction between resistance unit r6 and battery B11 and the grid 106 of this tube T4 is biased slightly minus with respect to this potential on cathode 105 through the medium of the grid battery 91. Tubes Tc and Td are similarly interconnected. The suppression grid 108 is directly connected to the cathode 105 in the usual manner and the screen grid 107 of this tube T4 is connected to an intermediate point of the plate battery B13 in the usual manner. This tube T4 preferably has such potentials applied to its various elements so as to function as a class B amplifier so as not to respond to any potentials below 0 applied to its control grid 106. The pentode Td is connected to its associated tube Tc in the same manner as pentode T4 is connected to its associated tube T3. These pentodes T4 and Td have a common plate source B13 the negative terminal of which is connected directly to the cathodes of these tubes. These pentodes T4 and Td are provided with a series resistance r8—r9 having its mid-point connected to the plus terminal of plate battery B13 which resistance unit is in turn connected in multiple with the resistance unit r2—r3 also having its mid-point connected to the plus terminal of battery B13, except for the inclusion of a choke coil Ch1 between resistance units r2 and r8 and a choke coil Ch2 between the resistance units r3 and r9. For reasons which are now apparent such output energies as are delivered by the plate circuits of tubes T4 and Td are pulsating in nature and for the reason that it is desirable to have a continuous average voltage, dependent on the magnitude of these pulses, applied to the sweep plates of the cathode-ray tube K2 these choke coils Ch1 and Ch2 have been provided. In other words, these choke coils Ch1 and Ch2 in combination with the associated resistances r2, r3, r8 and r9 constitute filtering means, or smoothing-out means, for smoothing out the ripples of plate circuit current into a substantially continuously direct current. In this connection it should be noted that this direct current energy applied across the resistance units r2 and r3 is of opposite polarity so that it is the difference of the energy delivered by the two tubes that is effectively applied across the sweep plates 10—11. In other words, if one of the pentodes T4 or Td delivers energy to the resistance unit r2—r3 potential of one polarity will be applied to the sweep plates 10—11 whereas if energy from the other pentode is applied to these resistances r2—r3 the sweep plates 10—11 will be energized by potential of reverse polarity. From the foregoing discussion it is readily understood that the choke coils Ch1 and Ch2 in combination with the associated resistance units will in the event the individual potentials are unequal cause a substantially continuous potential to be applied across the sweep plates 10 and 11, so that the electron beam 100 assumes a more or less steady position and does not flicker in accordance with the frequency of the pulsating current derived from the alternating current received. It should be understood that the choke coils Ch1 and Ch2 are merely a conventional representation of a filter network and that in practice more elaborate filtering means may be employed, if desired. The tubes Ta, Tb, Tc and Td are respectively identical to, and are respectively identically interconnected as are, the tubes T1, T2, T3 and T4, and for this reason like reference characters have been applied to many of the like elements of these tube circuits.

It is readily understood from the foregoing discussion that during inactivity of these tubes T4 and Td practically no current flows in these resistance units r8 and r9 for which reason the potential drop across these resistances becomes the resistance units r2 and r3 connected respectively across these resistances r8 and r9 through the medium of choke coils Ch1 and Ch2.

The sweep plates 12 and 13 of the cathode-ray tube K2 are controlled by a similar set of eight electronic tubes in accordance with energies received by the dipoles 5—6 and 7—8 in the same manner as the sweep plates 10 and 11 are controlled by the dipoles 1—2 and 3—4.

*Operation.—Figs 17-20.*—Let us assume that the ground located horizontal radiators HTA1 and HTA2 (Fig. 2) are energized by ultra-high frequency current of one frequency and that the vertical radiators VTA1 and VTA2 are energized by ultra-high frequency currents of another frequency, the wave lengths of these frequencies being in proportion to the distances between their respective radiators. If desired the spacing between these radiators may be chosen with respect to the frequency employed as to give the desired sensitivity of the apparatus at the point of entrance into the tolerance pyramid.

When the apparatus shown in Fig. 2 is used with the airplane carried apparatus illustrated in Fig. 17 the energies emitted by the horizontal radiators HTA1 and HTA2 are emitted in exact phase with each other. Likewise the energies emitted by the vertical radiators VTA1 and VTA2 are emitted in exact phase. Also, the dipoles of radiating antennas HTA1 and HTA2 are disposed vertically and horizontally, respectively, as illustrated in Figs 2A and 2B and these energies are capable of being picked up by the dipoles 1—2 and 3—4, respectively, of the receiving antenna RA2 shown in Fig. 17 of the drawings. The other dipoles 5—6 and 6—7 are arranged diagonally but since they are associated with radio apparatus functioning on a different frequency they will not be affected.

The energy emitted from the ground located antenna HTA1 is therefore applied to the amplifier and volume control unit AV1 through the medium of the transformer Tr9 whereas the energy emitted by the ground located antenna HTA2 is applied to the amplifier and volume control unit AVa through the medium of transformer Tr10 on the airplane.

Let us first consider the operation of the apparatus when the ultra-high frequency radio currents received from the ground located antennas HTA1 and HTA2 are received in phase. Referring to Fig. 17, under the conditions just assumed, the grids 81 of the tubes T1 and Ta will have positive waves applied thereto simultaneously so that the alternating current component in their plate circuits are in phase. Under this condition when (+) energy flows from the secondary winding 110 of the transformer Tr7 to the grid 102 of the tube T3 then also positive potential is applied to the grid 82 of the tube T2 from the secondary winding 111 of the transformer Tr8 which in turn causes (—) potential constituting the resistance drop across the resistance r4 in the plate circuit of the tube T2 to be simultaneously applied to the suppression grid 104 of the tube T3. The tube T3 so functions that this (—) potential applied to the suppression grid 104 will prevent the control grid 102 from causing the flow of current in the plate circuit of this tube T3. Tube T3 therefore remains inactive as will also the tube T4 controlled thereby. In a similar manner as just pointed out the tube Tc remains inactive because the (+) potential applied by the secondary winding 110 of the transformer Tr8 to the grid 102 of this tube Tc produces no effect because the secondary winding 11 of the transformer Tr7 through the medium of the tube Tb causes a negative suppressing potential to be simultaneously applied to the suppressing grid 104 of the tube Tc. The tetrode tube Tc therefore remains inactive to thereby cause the pentode tube Td which it controls to also remain inactive. This has been illustrated graphically in Fig. 18 of the drawings where the waves of potential applied to the grids of tubes T3 and Tc have been illustrated. The potentials derived from the transformer Tr8 have been shown shaded horizontally whereas the potentials derived from the transformer Tr7 have been shown unshaded. This graphic illustration in Fig. 18 shows that the potential wave applied to the grid 102 of the tube T3 is for a much shorter time period than is the negative potential wave applied to the suppressing grid 104 of this same tube. In a similar manner, the lower portion of Fig. 18 illustrates that the potential wave illustrated by shaded area 120 and applied to the grid 102 of the tube Tc is of shorter duration than is the unshaded area 121 applied to the suppressing grid 104 of this tube Tc. Since the potential waves 120 and 122 of Fig. 18 are entirely neutralized by the negative potential waves 121 and 123 no energy will flow in the plate circuits of either the tube T3 or the tube Tc.

Let us now assume that the energy applied to the transformer Tr7 leads in phase the energy applied to the transformer Tr8 so that the potential wave 122 (Fig. 19) applied to the grid 102 of tube T3 is not entirely blanked out by the negative potential applied to the suppression grid 104 of this tube T3 as illustrated by the potential wave 123 (Fig. 19). In this case, the tube T3 will be active for a short time for each cycle and will deliver energy in its plate circuit proportional to the diagonally shaded area 125 illustrated in Fig. 19 of the drawings. This is, however, not true of tube Tc the performance of which is illustrated in the lower portion of Fig. 19, in that the blanking energy as illustrated by potential wave 121 leads the control energy indicated by potential wave 120 so that the potential applied to the control grid 102 of the tube Tc becomes entirely ineffective, the suppressing grid 104 of this tube Tc having been effective before energy was applied to the control grid 102 and also remained present after the application of potential to the control grid 102 had ceased. Under this condition tubes T3 and T4 will be activated for each cycle of received radio energy whereas tubes Tc and Td will remain entirely inactive. The net result is that current will flow in resistance unit r8 whereas no current will flow in resistance unit r9.

The intermittent flow of current in this resistance unit r8 will cause a more or less continuous flow of current in the resistance unit r2 by reason of the choke coil CK1. The flow of this current in the resistance unit r2 in that it flows from the center point of the resistance unit r2—r3 to the free end of the resistance unit r2 will cause the sweep plate 11 to become charged positively whereas the sweep plate 10 is caused to be charged negatively as a result of which the electron beam 100 is moved to the right which indicates that the airplane itself which is represented by the cross 26 on the screen S is to the left of the lighted spot 27 created by the electron beam 100. This is as it should be since when the airplane is to the left the distance from the airplane to the antenna HTA1 is less than it is to antenna HTA2 so the phase of radio energy from the antenna HTA1 leads.

If now, on the other hand, the voltage applied to the grid 81 of tube Ta leads the application of voltage of grid 81 of tube T1, as conventionally illustrated by the graphs in Fig. 20 of the drawings the amplifying tubes Tc and Td will be activated whereas the tubes T3 and T4 will remain inactive as readily understood from the graphic illustrations illustrated in Fig. 20 of the drawings when considered in the light of the above discussion. It is thus seen that if the airplane is to the left of the glide path and the energy transmitted by the ground located antenna HTA1 reaches the airplane antenna RA2 slightly earlier than does the energy transmitted by the antenna HTA2, the upper set of tubes T1, T2, T3 and T4 will become active whereas the tubes Tc and Td in the lower group will remain inactive, so that as a result of this functioning of the tubes the electron beam 100 will be moved toward the right on the screen S to signify that the airplane is to the left of the course. Similarly, if the airplane is to the right of the course and the distance to the ground located antenna HTA2 is slightly less (to an extent less than one-fourth of a cycle) than the distance to the antenna HTA1 the lower set of tubes Tc and Td will become active whereas the corresponding tubes of the upper set T3 and T4 will remain inactive. As a result of this the electron beam 100 will be moved to the left indicating that the airplane is to the right of the course as defined by a locus of the apexes of various equilateral triangles having the distance from the antenna HTA1 to the antenna HTA2 as a base.

It is readily understood that for the same distance off the glide path the farther the airplane is away from the ground located radiators HTA1 and HTA2 the less difference there will be between straight lines extending from the airplane to these radiators so that the farther the airplane is away from the landing strip the less sensitive will be the indication created by the electron beam 100. In other words, the space in which the airplane may maneuver and still stay within the limits where the total difference between the transmitting distance from the two ground located radiators HTA1 and HTA2 to the airplane is less than one-fourth of a cycle or wave length constitutes a pyramid as conventionally illustrated by the tolerance pyramid indicated by dot and dash lines 38 in Fig. 3 of the drawings. There is a decided advantage in this feature of applicants' invention in that the apparatus is less sensitive when the pilot first tries to enter upon the glide path and becomes more sensitive as he approaches the landing strip upon which he is to land the airplane. As already pointed out this sensitiveness of the apparatus as the airplane nears the landing strip may be made less pronounced by the use of a time controlled rheostat illustrated in Fig. 16 of the drawings. Apparatus of this kind may also be used with the apparatus illustrated in Fig. 17. The dot and dash lines shown in Fig. 3 of the drawings are not exactly straight lines so that the solid formed by two sets of such lines do not really constitute a pyramid, this by reason of the fact that these lines 38 correspond to the locus of a hyperbolic function. These lines are, however, so near straight for the first two miles from the landing strip that they may be assumed to be straight lines for all practical purposes.

As already pointed out a checking antenna CTA (Fig. 3) in combination with associated apparatus on the airplane (Fig. 1) may be employed to render the airplane carried apparatus inactive and non-responsive to radio energy radiated by the ground located antennas HTA1, HTA2, VTA1 and VTA2, this in order that the pilot will not get a false indication which might otherwise occur if the shift in phase should become more than one-fourth cycle due to the fact that the airplane has deviated too far away from the glide path. This rendering of the airplane carried apparatus of Fig. 17 inoperative is accomplished through the medium of the checking relay CR shown in block form in Fig. 17. This check relay CR is controlled in a manner as already described in connection with Fig. 1 of the drawings.

Nothing has thus far been said about the operation of the Fig. 17 apparatus insofar as the vertical deviation from the glide path is concerned but this functioning of the apparatus is accomplished through the medium of the vertical antennas VTA1 and VTA2 which function through the medium of dipoles 5—6 and 7—8 and through the medium of a similar set of eight amplifying tubes such as shown in Fig. 17. The other eight tubes control the sweep plates 12 and 13 in exactly the same manner as the tubes illustrated in Fig. 17 control the sweep plates 10 and 11.

Figure 15:
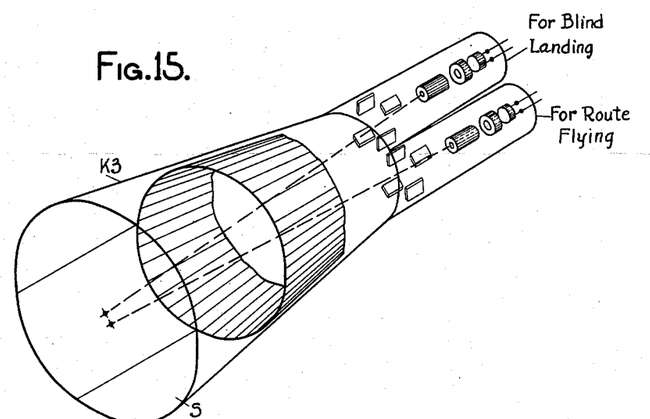
Fig. 15 illustrates a compound cathode-ray tube having two electron guns.

It should be understood that the feature for changing sensitivity shown in Fig. 16 and the checking feature involving check relay CR are optional features and may be omitted if desired. Also the system disclosed is applicable to route flying in that in that event the spot 27 on the screen would be caused to move to the bottom of the screen as near the middle as possible. If some other form of route indication system, such for instance as disclosed in application Ser. No. 517,814, filed January 11, 1944, is to be employed with the present system, when used for landing purposes only, it may be desirable to employ a two-gun or double cathode-ray tube such as shown in Fig. 15. In that event the route flying indication is preferably displayed in the upper part of the screen whereas the landing indication is preferably displayed in the lower part of the screen S (Fig. 15).

Having thus shown and described several embodiments of the invention in which the difference in radio transmitting distances from an airplane carried antenna to two ground located antennas is measured by the phase displacement between two alternating currents or radio pulses of the same frequency, it should be understood that this measurement of the difference between the two radio transmitting distances may be accomplished by other means not necessarily involving phase displacement and it should be understood that various changes, modifications and additions may be made to control a cathode-ray tube so as to perform the functions hereinbefore described so long as these functions are performed by changes which come within the scope of the following claims.

What we claim as new is:

1. Apparatus for indicating on an airplane the location of a ground station during reduced visibility comprising; two ground located radio transmitters at a ground station and located a predetermined distance apart and each emitting radio energy of the same frequency and of fixed phase but each having its radio waves polarized at right angles to the radio waves emitted by the other transmitter; an airplane carried cathode-ray tube including a fluorescent screen; and airplane carried means including radio receivers for receiving radio energies polarized in two different planes at right angle to each other from said transmitters for directing the electron beam in said cathode-ray tube in accordance with the phase displacement between the two radio energies to a location on its fluorescent screen so as to define the difference in the distances said airplane is from the two ground located radio transmitters.

2. Apparatus for indicating on an airplane the location of a ground station during reduced visibility comprising; two ground located radio transmitters at a ground station and located a predetermined distance apart and each emitting distinctively characterized radio energy impulses in synchronism; an airplane carried cathode-ray tube including a fluorescent screen; airplane carried means including radio receivers and a compound antenna to which they are connected for receiving radio energy impulses distinctively from said two ground located transmitters for directing the electron beam in said cathode-ray tube on its fluorescent screen so as to define by an illuminated spot on the screen the difference in the distances said airplane is from the two ground located radio transmitters, checking means including a radio transmitter on the ground substantially equi-distant from said ground located radio transmitters radiating radio waves at a distinctive frequency substantially in the pattern of a cone having its axis coincident with a predetermined flight path, and airplane carried electro-responsive means distinctively responsive when the airplane is within said cone for effecting the illumination of said fluorescent screen.

3. Apparatus for indicating on an airplane the extent to which such airplane is from an approach glide path approaching a ground station during reduced visibility comprising; two ground located radio transmitters at a ground station and located a predetermined distance apart and each emitting radio energy of the same frequency and of fixed phase relationship but each having its radio waves polarized at right angles to the radio waves emitted by the other transmitter; an airplane carried cathode-ray tube including a fluorescent screen; and airplane carried means including radio receivers for receiving from said two transmitters radio energy polarized in two different planes at right angles to each other for directing the electron beam in said cathode-ray tube on said fluorescent screen in accordance with the phase relationship of the energies so received, whereby, since phase relationship between said energies indicates in fractions of wave length the difference in distances said airplane is from the two ground located radio transmitters said electron beam will indicate on said screen the extent to which said airplane is from the glide path which course has each point thereon equidistances from said two ground located transmitters.

4. Apparatus for indicating on an airplane the location of a ground station during reduced visibility comprising; two ground located radio transmitters at a ground station and located a predetermined distance apart and each emitting radio energy of the same frequency and having fixed phase relationship but each having its radio waves polarized at right angles to the radio waves emitted by the other transmitter; an airplane carried cathode-ray tube including a fluorescent screen; and airplane carried means including radio receivers for receiving radio energies polarized in two different planes at right angle to each other from said transmitters for directing the electron beam in said cathode-ray tube in accordance with the vector difference of the energies received to a location on its fluorescent screen so as to define on said screen the extent and direction to which said airplane is from an approach path which has each point thereon equi-distances from said two ground located radio transmitters.

5. Apparatus for incdicating on an airplane the location of a ground station during reduced visibility comprising; two ground located radio transmitters at a ground station and located a predetermined distance apart and each emitting distinctively characterized radio energy impulses in sychronism; an airplane carried cathode-ray tube including a fluorescent screen; and airplane carried means including radio receivers and a compound antenna to which they are connected for receiving radio energy impulses distinctively from said two ground located transmitters for directing the electron beam in said cathode-ray tube and producing an illuminated spot at a location on its fluorescent screen in accordance with the difference in time of the arrival of such impulses so as to define the direction and the difference in the distances said airplane is from the two ground located radio transmitters and to what extent it is off a line formed by points equi-distant from said ground transmitters, and checking means including a radio transmitter on the ground substantially equi-distant from said ground located radio transmitters radiating radio waves at a distinctive frequency along a pattern extending longitudinally of narrow spread substantially parallel to said line, and airplane carried electro-responsive means distinctively responsive in accordance with whether or not the airplane is within said pattern.

6. Apparatus for indicating on an airplane during reduced visibility the extent to which such airplane is from an approach path approaching a ground station comprising; two ground located radio transmitters at a ground station and located a predetermined distance apart at opposite sides of said path and each emitting radio energy of the same frequency and having fixed phase relationship but each having its radio waves polarized at right angles to the radio waves emitted by the other transmitter; an airplane carried cathode-ray tube including a fluorescent screen; and airplane carried means including radio receivers connected to a compound antenna for receiving from said two transmitters vectorially subtracted radio energies which during transmission were polarized in two different planes at right angles to each other, which energy difference is used for directing the electron beam in said cathode-ray tube to a point on said fluorescent screen with respect to its normal position in accordance with its value; whereby, since summation of said energies manifest phase relationship and indicates in fractions of wave length the difference in distances said airplane is from the two ground located radio transmitters said electron beam will indicate on said screen the extent to which said airplane is from an approach path which has each point thereon equi-distances from said two ground located transmitters.

7. Apparatus for defining a glide path by defining two planes at right angle to each other of which the intersection constitutes such glide path comprising; ground located apparatuses for defining each of two planes at right angle to each other in space each apparatus of which includes; two ground located radio radiators each comprising a pair of transmitters located on opposite sides of the glide path and emitting distinctive radio energy of the same frequency and having fixed phase relationship; and airplane carried apparatus including a cathode-ray tube including a fluorescent screen and a continuously active electron gun and also including for each ground located apparatus two receivers for distinctively receiving the radio energies from two corresponding distinctive ground located radio radiators, and means for directing the electron stream created by said electron gun so as to indicate on which side of each of the corresponding two planes in space the airplane is located; whereby since said electron stream is actuated by both of the ground located apparatuses said electron stream defines by the spot it creates on the fluorescent screen on which side of, above or below the glide path said airplane is located.

8. Apparatus for defining a glide path by defining two planes at right angle to each other of which the intersection constitutes such glide path comprising; ground located apparatuses for defining each of two planes substantially at right angle to each other in space each apparatus employing a different radio frequency and each including: two ground located radio radiators each emitting radio energy polarized in a plane at a right angle to the other and having fixed phase relationship; airplane carried apparatus including a cathode-ray tube including a fluorescent screen and a continuously active electron gun and also including for each ground located apparatus two receivers for distinctively receiving polarized radio energies from two corresponding ground located radio radiators, and means for directing the electron stream created by said electron gun so as to indicate by a spot on the screen on which side of the corresponding plane in space the airplane is located; whereby since said electron stream is actuated by both of the ground located apparatuses and two planes substantially at a right angle to each other are involved said electron stream defines on which side of, above or below a glide path defined by the line of intersection of said two planes said airplane is located.

9. Apparatus for indicating whether or not an airplane is travelling on its course defined by the intersection of two imaginary planes and how it is progressing in this travel comprising; means for defining a vertical imaginary plane including two active ground located radio radiators mounted the same distances on opposite sides of and at right angles to a point on such course, means for defining a horizontal sloping imaginary plane including two active ground located radio radiators one located near the ground and the other located some distance above the ground in a vertical plane parallel to the course and passing through said one radiator and both located in said last mentioned vertical plane and equal distances at right angles to and on opposite sides of a common point in said sloping plane, an airplane carried compound antenna, an airplane carried cathode-ray tube including an electron gun for emitting a concentrated electron beam, and airplane carried means for directing said electron beam in a direction with respect to a normal line in accordance with the differences in distances from said airplane carried antenna to each of the four ground located antennas at such point.

10. Apparatus for indicating whether or not an airplane is descending down or in which direction and to what extent it is deviating from a glide path comprising the intersection of two imaginary planes comprising; means for defining a vertical imaginary plane including two active ground located radio radiators mounted the same distances on opposite sides of and at right angles to a common point of a landing strip, means for defining a horizontal sloping imaginary plane including two active ground located radio radiators one located near the ground and the other located some distance above the ground in a vertical plane parallel to the landing strip and passing through said one radiator and both located in said last mentioned vertical plane and equal distances at right angles to a common point in said sloping imaginary plane, an airplane carried compound antenna, an airplane carried cathode-ray tube including an electron gun for emitting a concentrated electron beam, and airplane carried means for directing said electron beam in a direction with respect to a normal line in accordance with the differences in distances from said airplane carried antenna to each of the four ground located antennas including for each imaginary plane two volume control devices to maintain the received energies at substantially constant value and a transformer for vectorially subtracting the two radio energies received.

11. Apparatus for indicating whether or not an airplane is descending down or to what extent and direction it is deviating from a glide path comprising the intersection of two imaginary planes comprising; means for defining a vertical imaginary plane including two active ground located radio radiators mounted the same distances on opposite sides of and at right angles to a common point of a landing strip, means for defining a horizontal sloping imaginary plane including two active ground located radio radiators one located near the ground and the other located some distance above the ground in a vertical plane parallel to the landing strip and passing through said one radiator and both located in said last mentioned vertical plane and equal distances at right angles to a common point in said sloping imaginary plane, an airplane carried compound antenna, an airplane carried cathode-ray tube including an electron gun for emitting a concentrated electron beam, and airplane carried means for directing said electron beam in a direction with respect to a normal line in accordance with the differences in distances from said airplane carried antenna to each of the four ground located antennas including for each imaginary plane two volume control devices to maintain the received energies at substantially constant value and two electron tubes each having a control grid and a suppressing grid and so connected that current is delivered therefrom only if the phase relationship between the two radio currents received for that imaginary plane is in a particular phase direction.

12. Apparatus for indicating whether or not an airplane is descending down or to what extent and direction it is deviating from a glide path comprising the intersection of two imaginary planes comprising; means for defining a vertical imaginary plane including two active ground located radio radiators mounted the same distances on opposite sides of and at right angles to a common point of a landing strip, means for defining a horizontal sloping imaginary plane including two active ground located radio radiators one located near the ground and the other located some distance above the ground in a vertical plane parallel to the landing strip and passing through said one radiator and both located in said last mentioned vertical plane and equal distances at right angles to a common point in said sloping imaginary plane, an airplane carried compound antenna, an airplane carried cathode-ray tube including an electron gun for emitting a concentrated electron beam, airplane carried means for directing said electron beam in a direction with respect to a normal line in accordance with the differences in distances from said airplane carried antenna to each of the four ground located antennas, and means for informing the pilot of the airplane when the airplane flies outside predescribed limits of said glide path.

13. Apparatus for indicating whether or not an airplane is descending down or to what extent and direction it is deviating from a glide path comprising the intersection of two imaginary planes comprising; means for defining a vertical imaginary plane including two active ground located radio radiators mounted the same distances on opposite sides of and at right angles to a common point of a landing strip, means for defining a horizontal sloping imaginary plane including two active ground located radio radiators one located near the ground and the other located some distance above the ground in a vertical plane parallel to the landing strip and passing through said one radiator and both located in said last mentioned vertical plane and equal distances at right angles to a common point in said sloping imaginary plane, an airplane carried compound antenna, an airplane carried cathode-ray tube including an electron gun for emitting a concentrated electron beam, airplane carried means for directing said electron beam with respect to a normal line in accordance with the differences in distances from said airplane carried antenna to each of the four ground located antennas, and means manually operable to adjust the extent of movement of said electron beam for each predetermined extent of difference in said radio transmitting distances.

14. Apparatus for indicating on an airplane the location of a ground station during reduced visibility comprising; two ground located radio transmitters at a ground station and located a predetermined distance apart and each emitting radio energy of the same frequency and constant phase but each having its radio waves polarized at right angles to the radio waves emitted by the other transmitter; an airplane carried cathode-ray tube including a fluorescent screen; airplane carried means including radio receivers for receiving radio energy polarized in two different planes at right angles to each other from said transmitters for directing the electron beam in said cathode-ray tube to a location on its fluorescent screen with respect to a normal point so as to define the difference in the distances said airplane is from the two ground located radio transmitters, and manually operable means for adjusting the ratio of unit sidewise movement of said electron beam to the unit of differences in said radio transmitting distances.

15. Apparatus for indicating on an airplane the location of a ground station during reduced visibility comprising; two ground located radio transmitters at a ground station and located a predetermined distance apart and each emitting radio energy of the same frequency and constant phase but each having its radio waves polarized at right angles to the radio waves emitted by the other transmitter; an airplane carried cathode-ray tube including a fluorescent screen; airplane carried means including radio receivers for receiving radio energy polarized in two different planes at right angles to each other from said transmitters for directing the electron beam in said cathode-ray tube to a location on its fluorescent screen with respect to a normal point on said screen so as to define the difference in the distances said airplane is from the two ground located radio transmitters, and means for adjusting the sensitivity of response of said electron beam to changes in radio transmitting distance differences governed in accordance with the lapse of time.

16. Apparatus for indicating on an airplane the extent to which such airplane is from an approach glide path approaching a ground station during reduced visibility comprising; two ground located radio transmitters at a ground station and located a predetermined distance apart and each emitting radio energy of the same frequency and constant phase but each having its radio waves polarized at right angles to the radio waves emitted by the other transmitter; an airplane carried cathode-ray tube including a fluorescent screen; airplane carried means including radio receiver for receiving from said two transmitters radio energy polarized in two different planes at right angles to each other for directing the electron beam in said cathode-ray tube on said fluorescent screen to a position with respect to a normal point on said screen in accordance with the phase relationship of the energies so received, whereby, since phase relationship between said energies indicates in fractions of wave length the differences in distances said airplane is from the two ground located radio transmitters said electron beam will indicate on said screen the extent to which said airplane is from an approach path which has each point thereon equi-distances from said two ground located transmitters, and means for specially informing the pilot of the airplane when he flies outside certain prescribed limits of said glide path.

17. Apparatus for indicating within what discrepancy an airplane is descending down a glide path comprising the intersection of two imaginary planes comprising; means for defining a vertical imaginary plane including two active ground located radio radiators mounted the same distances on opposite sides of and at right angles to a common point of a landing strip, means for defining a horizontal sloping imaginary plane including two active ground located radio radiators one located near the ground and the other located some distance above the ground in a vertical plane parallel to the landing strip and passing through said one radiator and both located in said last mentioned vertical plane and equal distances at right angles to a common point in said sloping imaginary plane, an airplane carried compound antenna, an airplane carried cathode-ray tube including a fluorescent screen and an electron gun for emitting a concentrated electron beam, and airplane carried control means for directing said electron beam with respect to a normal point on said screen in accordance with the differences in distances from said airplane carried antenna to each of the four ground located antennas.

18. Apparatus for indicating to what extent an airplane descending down a glide path deviates from such path comprising the intersection of two imaginary planes comprising; means for defining a vertical imaginary plane including two active ground located radio radiators mounted the same distances on opposite sides of and at right angles to a common point of a landing strip, means for defining a horizontal sloping imaginary plane including two active ground located radio radiators one located near the ground and the other located some distance above the ground in a vertical plane parallel to the landing strip and passing through said one radiator and both located in said last mentioned vertical plane and equal distances at right angles to a common point in said sloping imaginary plane, an airplane carried compound antenna, an airplane carried cathode-ray tube including a fluorescent screen and an electron gun for emitting a concentrated electron beam, airplane carried control means for directing said electron beam with respect to a normal point on said screen in accordance with the differences in distances from said airplane carried antenna to each of the four ground located antennas, and means for rendering said airplane carried control means inoperative if the airplane flies outside prescribed limits of said glide path.

19. Apparatus for indicating to what extent an airplane departs from a glide path in descending down such glide path comprising the intersection of two imaginary planes comprising; means for defining a vertical imaginary plane including two active ground located radio radiators mounted the same distances on opposite sides of and at right angles to a common point of a landing strip, means for defining a horizontal sloping imaginary plane including two active ground located radio radiators one located near the ground and the other located some distance above the ground in a vertical plane parallel to the landing strip and passing through said one radiator and both located in said last mentioned vertical plane and equal distances at right angles to a common point in said sloping imaginary plane, an airplane carried compound antenna, an airplane carried cathode-ray tube including an electron gun for emitting a concentrated electron beam, airplane carried control means for directing said electron beam in a direction with respect to a fixed line in accordance with the differences in distances from said airplane carried antenna to each of the four ground located antennas, and manually operable means for adjusting the sensitivity of response of said electron beam to changes in radio transmitting distance differences.

20. Apparatus for indicating whether or not an airplane is descending down a glide path comprising the intersection of two imaginary planes or to what extent it is departing therefrom comprising; means for defining a vertical imaginary plane including two active ground located radio radiators mounted the same distances on opposite sides of and at right angles to a common point of a landing strip, means for defining a horizontal sloping imaginary plane including two active ground located radio radiators one located near the ground and the other located some distance above the ground in a vertical plane parallel to the landing strip and passing through said one radiator and both located in said last mentioned vertical plane and equal distances at right angles to a common point in said sloping imaginary plane, an airplane carried compound antenna, an airplane carried cathode-ray tube including an electron gun for emitting a concentrated electron beam, airplane carried control means for directing said electron beam with respect to a fixed line in accordance with the differences in distances from said airplane carried antenna to each of the four ground located antennas, and means for adjusting the sensitivity of response of said electron beam to changes in radio transmitting distance differences governed in accordance with the lapse of time.

21. Apparatus for indicating on an airplane the extent to which such airplane is off its course during reduced visibility comprising; two ground located radio transmitters at a ground station and located a predetermined distance apart and each emitting radio energy of the same frequency but each having its radio waves polarized at right angles to the radio waves emitted by the other transmitter; an airplane carried cathode-ray tube including a fluorescent screen and an electron gun; and airplane carried means including radio receivers for receiving from said two transmitters radio energy polarized in two different planes at right angles to each other for directing the electron beam created by said gun in said cathode-ray tube to a point on said fluorescent screen in accordance with the phase relationship of the energies so received, whereby, since phase relationship between said energies indicates in fractions of wave length the difference in distances said airplane is from the two ground located radio transmitters said electron beam will indicate on said screen the extent to which said airplane is off its course which course has each point thereon equi-distances from said two ground located transmitters.

OSCAR S. FIELD.
SEDGWICK N. WIGHT.

REFERENCES CITED

The following references are of record in the file of this patent:

UNITED STATES PATENTS

| Number | Name | Date |
| --- | --- | --- |
| 1,999,047 | Hahnemann | Apr. 23, 1935 |
| 2,112,824 | Brown et al. | Apr. 5, 1938 |
| 2,144,203 | Shanklin | Jan. 17, 1939 |
| 2,198,113 | Holmes | Apr. 23, 1940 |
| 2,218,907 | Donnelly et al. | Oct. 22, 1940 |
| 2,267,468 | Hahnemann | Dec. 23, 1941 |
| 2,400,232 | Hall | May 14, 1946 |
| 2,403,626 | Wolff et al. | July 9, 1946 |
| 2,405,231 | Newhouse | Aug. 6, 1946 |
| 2,405,238 | Seeley | Aug. 6, 1946 |
| 2,408,773 | Goodall | Oct. 8, 1946 |
| 2,417,807 | Brunner | Mar. 25, 1947 |
| 2,419,525 | Alford | Apr. 29, 1947 |
| 2,423,305 | Fletcher | July 1, 1947 |

FOREIGN PATENTS

| Number | Country | Date |
| --- | --- | --- |
| 445,976 | Great Britain | Apr. 22, 1936 |